US010361869B2

(12) United States Patent
Gorman

(10) Patent No.: US 10,361,869 B2
(45) Date of Patent: Jul. 23, 2019

(54) EVENT LEDGER

(71) Applicant: International Business Machines Corporation, Armonk, NY (US)

(72) Inventor: Michael A. Gorman, Columbia, SC (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 15/244,731

(22) Filed: Aug. 23, 2016

(65) Prior Publication Data

US 2018/0062848 A1 Mar. 1, 2018

(51) Int. Cl.
*H04L 9/32* (2006.01)
*H04L 9/06* (2006.01)

(52) U.S. Cl.
CPC .......... *H04L 9/3247* (2013.01); *H04L 9/0643* (2013.01); *H04L 9/321* (2013.01); *H04L 9/3239* (2013.01); *H04L 9/3263* (2013.01); *H04L 2209/38* (2013.01)

(58) Field of Classification Search
CPC ....... H04L 9/3247; H04L 9/0643; H04L 9/14; H04L 9/30; H04L 9/3239; H04L 9/3263; H04L 2012/5682; H04L 9/3249; H04L 9/3252; H04L 9/3255; H04L 9/3257; G06F 21/16; G06F 21/64; G06F 2221/0733; G11B 20/00289; G11B 20/00884; H04N 2005/91335; H04N 21/8358
USPC ........................................................ 713/176
See application file for complete search history.

(56) References Cited

U.S. PATENT DOCUMENTS

| | | | |
|---|---|---|---|
| RE34,954 E | 5/1995 | Haber et al. | |
| 9,769,153 B1* | 9/2017 | Bowen | H04L 63/0823 |
| 9,967,333 B2* | 5/2018 | Chen | H04L 67/104 |
| 9,967,334 B2* | 5/2018 | Ford | H04L 67/1044 |
| 2004/0039906 A1* | 2/2004 | Oka | H04L 63/065 |
| | | | 713/156 |
| 2004/0098589 A1* | 5/2004 | Appenzeller | H04L 9/3073 |
| | | | 713/170 |
| 2005/0108533 A1* | 5/2005 | Ji | G06Q 20/3672 |
| | | | 713/171 |
| 2011/0055911 A1* | 3/2011 | Adelman | G06Q 10/107 |
| | | | 726/7 |
| 2013/0103599 A1 | 4/2013 | Sgrazzutti et al. | |
| 2015/0206106 A1* | 7/2015 | Yago | G06Q 20/0658 |
| | | | 705/68 |

(Continued)

FOREIGN PATENT DOCUMENTS

WO WO2015179020 A2 11/2015

*Primary Examiner* — Shahriar Zarrineh
(74) *Attorney, Agent, or Firm* — Scully, Scott, Murphy & Presser, P.C.; Joseph Petrokaitis, Esq.

(57) ABSTRACT

The present disclosure provides a globally accessible, un-forgeable, and permanent repository of published events in the form of an event ledger. A method according to the present disclosure includes receiving a request from a publisher to publish to an event ledger an event including a name of the publisher, a date and time at which the event occurred, a description of the event, and a cryptographic signature of the event signed using a private key of the publisher, receiving a certificate from the publisher including a public key of the publisher, validating the cryptographic signature of the event using the received certificate, and publishing the event to the event ledger.

18 Claims, 5 Drawing Sheets

(56) References Cited

U.S. PATENT DOCUMENTS

| | | | |
|---|---|---|---|
| 2015/0371224 A1* | 12/2015 | Lingappa | G06Q 20/3829 705/71 |
| 2016/0191243 A1* | 6/2016 | Manning | H04L 9/32 713/168 |
| 2016/0218879 A1* | 7/2016 | Ferrin | H04L 9/3247 |
| 2016/0261690 A1* | 9/2016 | Ford | H04L 67/1044 |
| 2016/0283941 A1* | 9/2016 | Andrade | H04L 9/3247 |
| 2016/0292672 A1* | 10/2016 | Fay | G06Q 20/363 |
| 2016/0330034 A1* | 11/2016 | Back | G06Q 20/06 |
| 2016/0342977 A1* | 11/2016 | Lam | G06Q 20/02 |
| 2016/0342994 A1* | 11/2016 | Davis | G06Q 20/027 |
| 2016/0364723 A1* | 12/2016 | Reese | G06Q 20/38215 |
| 2017/0005804 A1* | 1/2017 | Zinder | H04L 9/3247 |
| 2017/0011460 A1* | 1/2017 | Molinari | G06Q 40/04 |
| 2017/0046693 A1* | 2/2017 | Haldenby | G06Q 20/0655 |
| 2017/0046698 A1* | 2/2017 | Haldenby | G06Q 20/0655 |
| 2017/0046792 A1* | 2/2017 | Haldenby | G06Q 20/0655 |
| 2017/0048209 A1* | 2/2017 | Lohe | H04L 63/0442 |
| 2017/0085555 A1* | 3/2017 | Bisikalo | H04L 63/0807 |
| 2017/0124556 A1* | 5/2017 | Seger, II | G06Q 20/3829 |
| 2017/0243193 A1* | 8/2017 | Manian | G06Q 20/3829 |
| 2017/0300627 A1* | 10/2017 | Giordano | G16H 10/60 |
| 2017/0301047 A1* | 10/2017 | Brown | G06Q 50/18 |
| 2017/0310484 A1* | 10/2017 | Kaliski, Jr. | H04L 9/3247 |
| 2017/0324738 A1* | 11/2017 | Hari | H04L 61/1511 |
| 2017/0330159 A1* | 11/2017 | Castinado | G06Q 20/02 |
| 2017/0331896 A1* | 11/2017 | Holloway | H04L 67/12 |
| 2017/0344988 A1* | 11/2017 | Cusden | H04L 9/3247 |
| 2017/0345011 A1* | 11/2017 | Salami | G06Q 20/42 |
| 2017/0346639 A1* | 11/2017 | Muftic | H04L 9/3268 |
| 2017/0346693 A1* | 11/2017 | Dix | H04L 9/3247 |
| 2018/0007131 A1* | 1/2018 | Cohn | H04L 67/1068 |
| 2018/0013547 A1* | 1/2018 | Giura | H04L 9/3239 |
| 2018/0025435 A1* | 1/2018 | Karame | G06Q 40/12 705/30 |
| 2018/0026979 A1* | 1/2018 | Cox | G06F 21/6227 |
| 2018/0204191 A1* | 7/2018 | Wilson | G06Q 20/3829 |

* cited by examiner

EVENT LEDGER

TECHNICAL FIELD

The present disclosure relates to the publication of events and to a public ledger of published events.

BACKGROUND

Blockchain technology was developed as a way of providing a publicly transparent and decentralized ledger that is configured to track and store digital transactions in a publicly verifiable, secure, and hardened manner to prevent tampering or revision.

Recently, the use of blockchain technology has expanded beyond crypto currency to provide a framework for the execution of smart contracts. Smart contracts are self executing agreements between parties that have all of the relevant covenants spelled out in code, and settle automatically, depending on future signatures or trigger events. By leveraging blockchain technologies, smart contracts, once appended to the blockchain, cannot be revoked, denied, or reversed, since decentralized execution removes them from the control of any one party.

Smart contracts deployed on blockchains often require knowledge of some form of triggering event to achieve fulfillment. For example, a smart contract that specifies payment on delivery of a product may need some indication that the product has been delivered before the contract may be fulfilled. Various smart contract networks (e.g., Ethereum®, OpenLedger™, etc.) have attempted to provide "oracles", e.g., systems or API's that provide real-world information to the smart contract network, to connect the smart contracts to real world events. However, each smart contract network typically defines a different proprietary way of creating and utilizing oracles which may inhibit the dissemination of events to every blockchain network due to the amount of effort required by a publisher of information to separately comply with each smart contract network's proprietary methods.

BRIEF SUMMARY

The system, method, and computer program product described herein provide a globally accessible, un-forgeable, and permanent repository of published events in the form of an event ledger.

In an aspect of the present disclosure, a method is disclosed. The method includes receiving a request from a publisher to publish an event to an event ledger. The event includes a name of the publisher, a date and time at which the event occurred, a description of the event, and a cryptographic signature of the event signed using a private key of the publisher. The method further includes receiving a certificate from the publisher. The certificate includes a public key of the publisher. The method further includes validating the cryptographic signature of the event using the received certificate, and publishing the event to the event ledger.

In aspects of the present disclosure apparatus, systems, and computer program products in accordance with the above aspect may also be provided.

BRIEF DESCRIPTION OF THE DRAWINGS

The details of the present disclosure, both as to its structure and operation, can best be understood by referring to the accompanying drawings, in which like reference numbers and designations refer to like elements.

DETAILED DESCRIPTION

The present disclosure provides a globally accessible, un-forgeable, and permanent repository of published events in the form of an event ledger. Any party may publish an event to the event ledger and any party may examine the events published to the event ledger. For example, the published events may be used to drive any number of smart contracts residing on any number of smart contract networks, for example, by querying the repository. In addition, the published events may be used by any other party for any other use including, for example, e-business integrations, a court of law, settlement, or any other use that may require knowledge of a published event. In addition, any party that may not have been interested at the time that the event was published to the event ledger but became interested in the event after it was published to the event ledger may query the event ledger to obtain information about the published event.

In some aspects, the event ledger may be globally accessible such that, e.g., a party in any country or location may connect to and review events published on the event ledger Likewise, any party may submit an event for publishing on the event ledger.

The event ledger is un-forgeable because it is not the occurrence of an event itself that is stored in the event ledger but rather the statement or assertion by a publisher that the event has occurred. To prevent forging of events, e.g., an entity or individual posting an event in the name of another entity, each event also includes information that allows a third-party user to independently verify that the stated publisher of the event actually published the event to the event ledger. For example, a well known sports media company may publish an event including scores for a sports game to the event ledger. The published event will include an indication that the event was published by the well known sports media company with additional information that may be used by a third-party to independently validate that the well known sports media company was actually the source of the published event. This results in un-forgeable publication of events by publishers since the publisher can be validated by any third-party.

Some important considerations for such a repository of published events is how to identify the publisher of the event, and how a user of the repository may independently validate both the integrity of the published event (e.g., that is has not been tampered with) and that the identified publisher is the actual publisher of the event. For example, there may be a concern over whether the publishing entity identified as the publisher of the event to the repository was actually the one who published the event to the repository.

Figure 1:
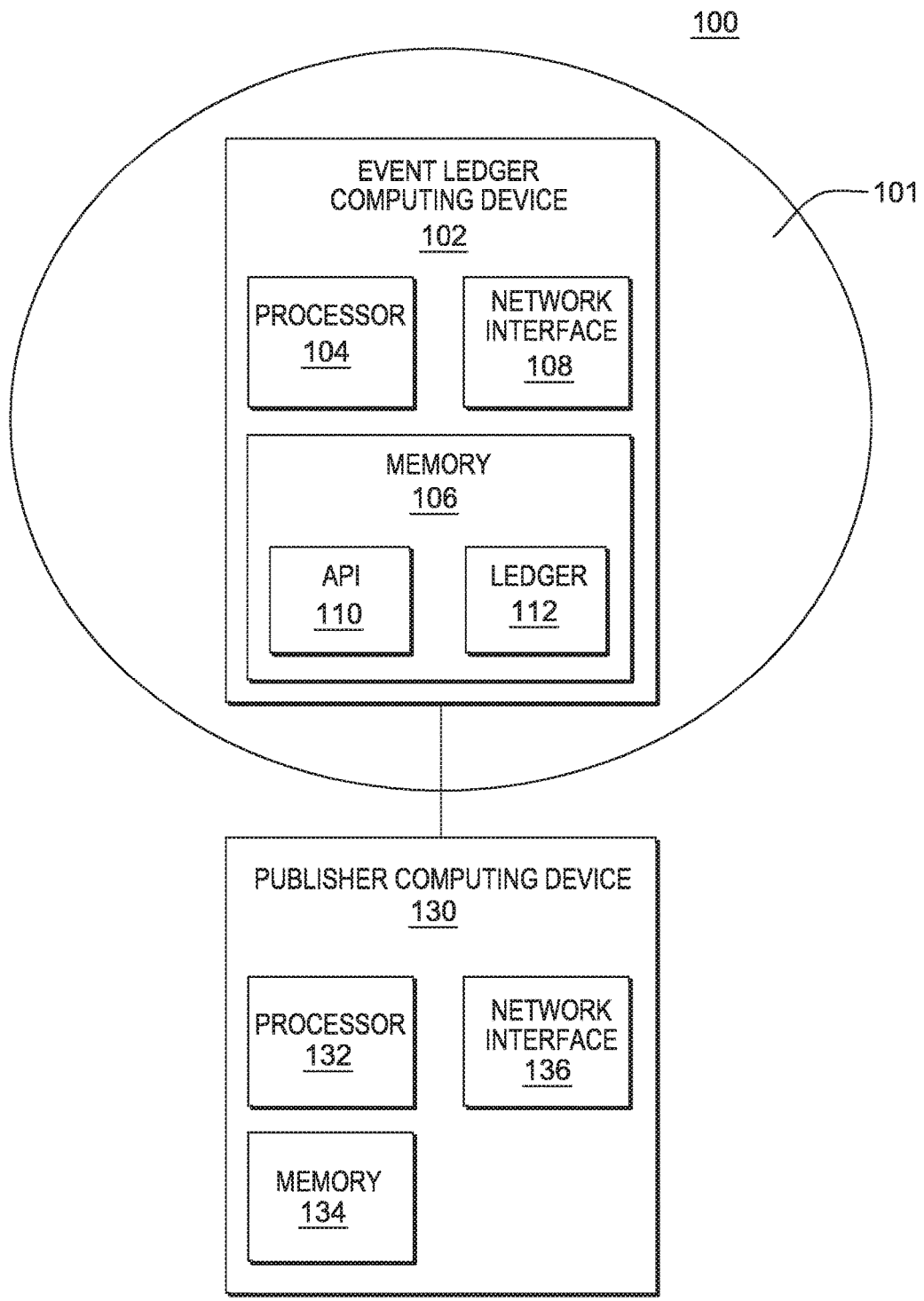
FIG. 1 is a system diagram illustrating a system in accordance with an aspect of the present disclosure.

With reference now to FIG. 1, a system 100 for implementing an event ledger 101 is illustrated. System 100 may include one or more computing devices 102 that implement event ledger 101 including, for example, at least one processor 104, memory 106, a network interface 108, and any other feature commonly found in a computing device. System 100 may also include or receive communications from one or more computing devices 130 associated with one or more publishers. Computing devices 130 may include at least one processor 132, memory 134, a network interface 136, and any other feature commonly found in a computing device. Processor 132, memory 134, and network interface 136 may be similar to processor 104, memory 106, and network interface 108.

Memory 104 and 134 may include instructions, software, and/or programs that may be executed by processor 102. In some aspects, memory 104 may store an application program interface (API) 110 that is executable by processor 102 to implement the event ledger 101. Memory 104 may also store a ledger data structure 112, e.g., a database or other data structure, for storing the event publications of the event ledger 101.

API 110 may present a user or publisher with an interface for publishing events to ledger 112 and for searching or querying ledger 112 for events.

Network interfaces 108 and 136 may be configured to communicate with one or more servers, computing devices, the internet, the cloud, or any other device, via wired or wireless technology. For example, network interface 108 may be configured to communicate with computing device 130 via network interface 136.

In some aspects, system 100 may include one or more servers that implement the event ledger 101. The servers may each be a computing device 102. For example, the ledger data structure 112 may be stored in a centralized database implemented by one or more servers of an entity that operates system 100.

In some aspects, one or more computing devices 102 may be distributed for implementing the event ledger 101. For example, the event ledger 101 may be implemented in a decentralized manner with ledger data structure 112 stored on a decentralized network of computing devices 102. In some aspects, all or a portion of ledger data structure 112 may be stored on each computing device 102. In some aspects, the event ledger 101 may be implemented as a blockchain stored on a network of computing devices 102. In some aspects, any user of event ledger 101 may download and store any or all of the published events stored on event ledger 101 at any time to create a backup of event ledger 101 or to use the published events for any other purpose.

Figure 2:
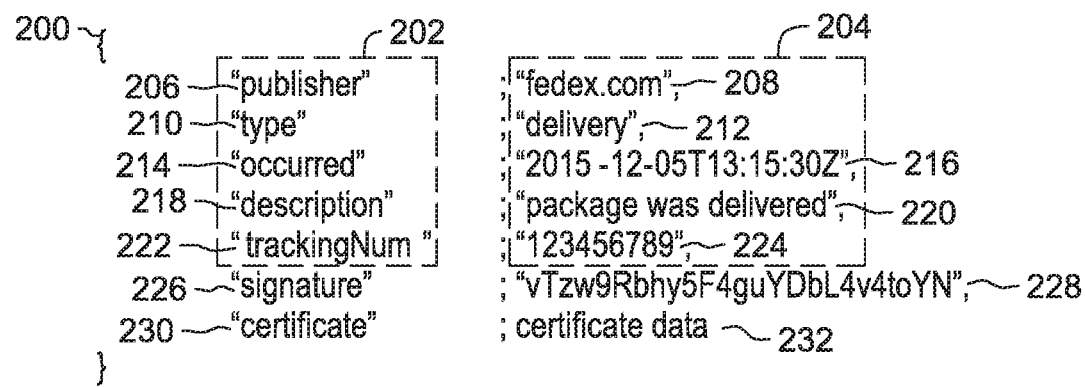
FIG. 2 is an example of an event in accordance with an aspect of the present disclosure.

With reference now to FIG. 2, an example event 200 that a publisher may request to publish to the event ledger 101 is illustrated. In some aspects, event 200 may be formatted as a JavaScript Object Notation (JSON) file including paired fields 202 and corresponding data 204. Other file formats may also be used.

In some aspects, event 200 may include a field 206 of "publisher". Field 206 identifies the publisher of event 200. For example, data 208 corresponding to field 206 may include a web site or domain address associated with a publisher, e.g., "fedex.com." In some aspects, data 208 may include only a name of a publisher, e.g., "fedex" without a web site or domain address. In some aspects, data 208 may include any other item of information that identifies the publisher to a user of the event ledger 101.

In some aspects, event 200 may include a field 210 of "type". Field 210 identifies a type of event 200. For example, data 212 corresponding to field 210 may include the type of the event 200, e.g., "delivery". Other types of events are also contemplated. For example, a type of the event may be a transaction, a purchase, a sports score, an airline flight departure, or any other event that a publisher may wish to publish to event ledger. In some aspects, no type may be included in event 200.

In some aspects, event 200 may include a field 214 of "occurred" or "date/time." Field 214 identifies a date, time, or both, at which the event occurred. For example, data 216 corresponding to field 214 may include a date, a time, or both. The date and time may be formatted in any manner. In some aspects, system 100 may specify a required format for the date and time. For example, system 100 may specify that the date is first followed by the time or vice versa. In some aspects, system 100 may specify whether any dashes, colons or other separators are required. In some aspects, if the date/time format does not meet the requirements of system 100, the event 200 may be rejected. For example, system 100 may transmit a message to the publisher indicating that the request was rejected for having an incorrect date/time format. System 100 may provide the publisher with an example of the correct date/time format as required by system 100.

In some aspects, event 200 may include a field 218 of "description." Field 218 may be used by a publisher to describe or input data associated with the event. For example, data 220 corresponding to field 218 may include a description of "package was delivered". In some aspects, data 220 may include any other description. For example, data 220 may include scores of a sporting event, departure or arrival notifications of airlines, or any other description of an event.

In some aspects, event 200 may include one or more additional custom fields 222 specific to a particular type of event 200. For example, where the event 200 is a delivery, a custom field 222 may be a field of "trackingNum" that identifies a tracking number for a package that was delivered. For example, data 224 corresponding to field 222 may include a tracking number that a user may enter into an application or web site of a carrier to obtain tracking information from the carrier. In some aspects, one or more additional or alternative fields 202 and corresponding data 204 may also be included in an event 200 depending on the nature of the event 200. For example, an event 200 to publish a sporting event may include fields for data such as scores, stats, player information, team names, injuries, etc. An event 200 to publish a weather event, e.g., by a meteorologist or news publisher, may include fields for data such as different kinds of weather patterns, different locations or regions, a storm track, wind speed, etc.

Sometimes, one or more of custom fields 222 may include sensitive data related to the event 200. In some aspects, a publisher may encrypt one or more of custom fields 222 to provide protection for the sensitive data.

In some aspects, event 200 may also include a signature of the event 200 signed using a private key of the publisher. For example, the publisher of the event may apply a hash of fields 202 and data 204 of the event 200 and may use a private key to generate a cryptographic signature of the event 200 based on the applied hash. In some aspects, all white space and other formatting outside of the quotes may be removed from the event 200 prior to generating the cryptographic signature to ensure that the hash may be repeatable regardless of formatting. In some aspects, event fields 202 and corresponding data 204 may be sorted into alphabetical order prior to hashing to further assist in repeatable hashing of the event 200. In some aspects, the resulting string may be hashed, for example, using a SHA-256 hashing algorithm, and the result may be Base64-encoded. In some aspects, the Base64-encoded result may then be cryptographically signed using the private key of the publisher. Any other method of hashing may be used by the publisher or required by event ledger, so long as the method of hashing is prescribed, including whether alphabetical sorting is used, whether any white space or other formatting is taken into account, what hashing algorithm is used, whether encoding is used on the result, or any other methods. Once the cryptographic signature 228 has been generated, a "signature" field 226 and the cryptographic signature 228, e.g., "vTzw9Rbhy5F4guYDbL4v4toYN", may be added to the request by the publisher.

In some aspects, the publisher may also provide a certificate to the event ledger 101 with the request or in a separate communication from the request. The certificate may, for example, be a code signing certificate that the publisher received from an independent third-party certificate authority. In some aspects, the code signing certificate may be a certificate associated with the publisher's domain name or web site, e.g., an X.509 certificate. The certificate may include the publisher's public key that may be used to verify the cryptographic signature 228. For example, event ledger 101 may verify the cryptographic signature before publishing the event, or a user of event ledger may wish verify the cryptographic signature 228 independently after the event has been published. Because only an entity in possession of the publisher's private key for the certificate will be able to create a valid cryptographic signature 228, the certificate may be used to validate the cryptographic signature 228 to confirm that the published event was indeed published by the publisher. In some aspects, where event ledger 101 previously received a copy of the publisher's certificate, no certificate may need to be submitted or retrieved from the publisher and event ledger 101 may use the previously received copy.

In some aspects, a "certificate" field 230 and certificate data 232 may be added to the request by the publisher. In some aspects, the certificate may not be included with the request and the event ledger 101 may, upon receipt of a request including event 200, separately request the certificate from the publisher, e.g., by accessing the domain name or web site identified in data 208 of the "publisher" field 206, if data 208 includes a domain name or web site. For example, the event ledger 101 may download the X.509 certificate of the publisher from the publisher's domain name or web site. Event ledger 101 may add or append the certificate to event 200 for publishing with event 200. In some aspects, event ledger 101 may also add or append the name of the certificate authority that the publisher received the certificate from to event 200.

In some aspects, event ledger 101 may also follow the certificate chain until a well-known and trusted certificate authority is identified, e.g., VeriSign, and may record the name of the certificate authority with the event 200.

Figure 3:
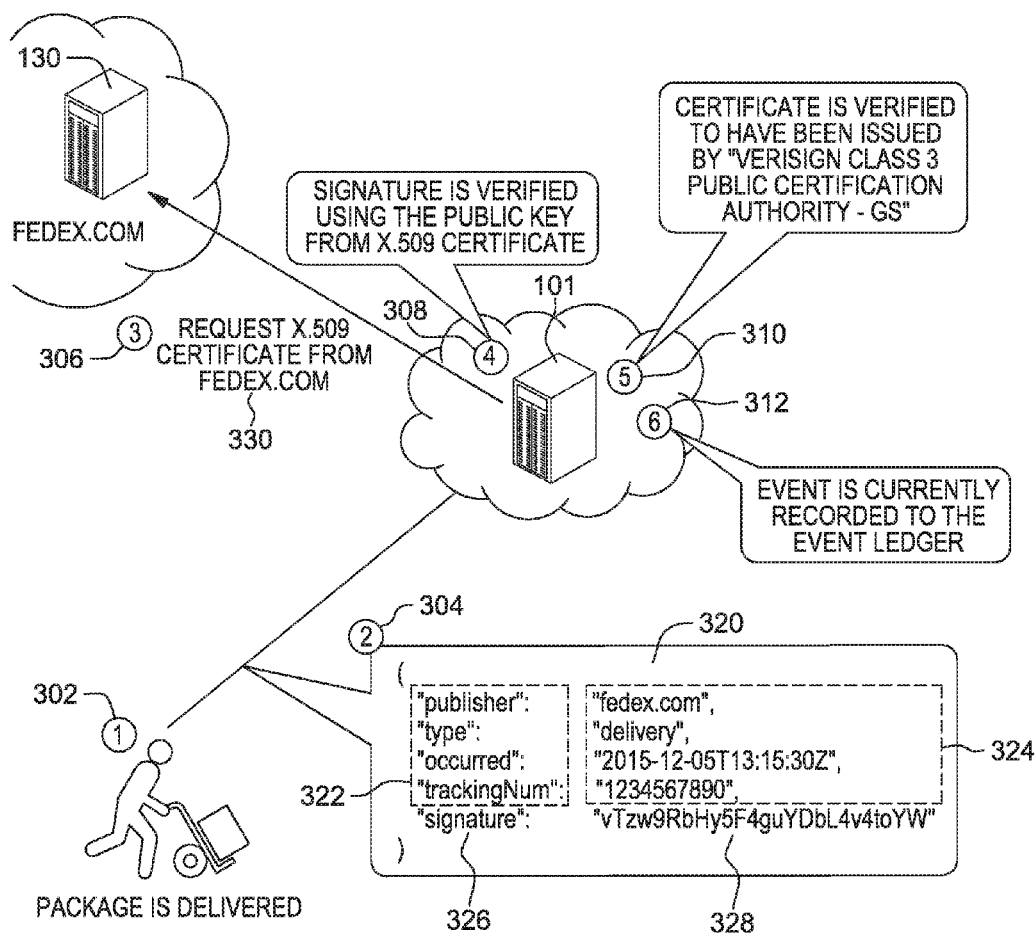
FIG. 3 is a flow diagram illustrating a method in accordance with an aspect of the present disclosure.

With reference now to FIG. 3, an example flow diagram for adding an event 200 to the event ledger 101 is illustrated. At 302, a package is delivered by a publisher, for example, a delivery carrier such as Fedex®. At 304, the delivery carrier submits a request to publish an event 320 on the event ledger 101, e.g., to one or more computing devices 102 of event ledger 101, for example, via a web site portal using API 110. The event 320 includes fields 322 and corresponding data 324. For example, event 320 includes a "publisher" field 322 having data 324 of "fedex.com", a "type" field 322 having data 324 of "delivery", an "occurred" field 322 having data 324 of "2015-12-05T13:15:30Z", a "description" field 322 having data 324 of "package was delivered", and a "trackingNum" custom field 322 having data 324 of "1234567890". The request also includes a signature field 326 and a cryptographic signature 328. For example, the delivery carrier obtains a hash of the fields 322 and data 324 as described above and cryptographically signs the obtained hash using the delivery carrier's private key. The signature field 326 and the cryptographic signature 328 of the hash are added to the request by the delivery carrier for submission with the event 320.

At 306, if the delivery carrier's certificate 330 is not provided as part of the request, and event ledger 101 does not already have a copy of the delivery carrier's certificate 330, event ledger 101 may request the certificate 330 from the delivery carrier. For example, event ledger 101 may request the delivery carrier's X.509 certificate from the delivery carrier's domain name or web site (e.g., fedex.com). The certificate 330 may be requested, for example, via network interface 136 of computing device 130 or may be requested by contacting the delivery carrier in another manner.

At 308, event ledger 101 validates the cryptographic signature 328 submitted with event 320 using the certificate 330. For example, event ledger 101 uses the public key included in certificate 330 to validate that the cryptographic signature 328 corresponds to the hash of fields 322 and data 324 of the event 320, for example, as described above.

At 310, event ledger 101 follows the certificate chain of certificate 330 and verifies that certificate 330 was issued by a known and trusted certificate authority, e.g., VeriSign Class 3 Public Primary Certificate Authority-G5.

At 312, once the cryptographic signature 328 is validated and the certificate has been verified, the event is permanently recorded in event ledger 101, e.g., on ledger 112. In some aspects, the certificate and the name of the certificate authority are appended to the recorded event.

Once an event has been recorded in event ledger 101, any party may access and independently verify the event, for example, by using the public key provided in the certificate 330 to validate the cryptographic signature 328 and by verifying with the named certificate authority that the certificate is valid.

In some aspects, if no known or trusted certificate authority can be found by event ledger 101, the event and certificate may still be recorded in event ledger 101 but with an indication that the certificate authority is "unverified".

Figure 4:
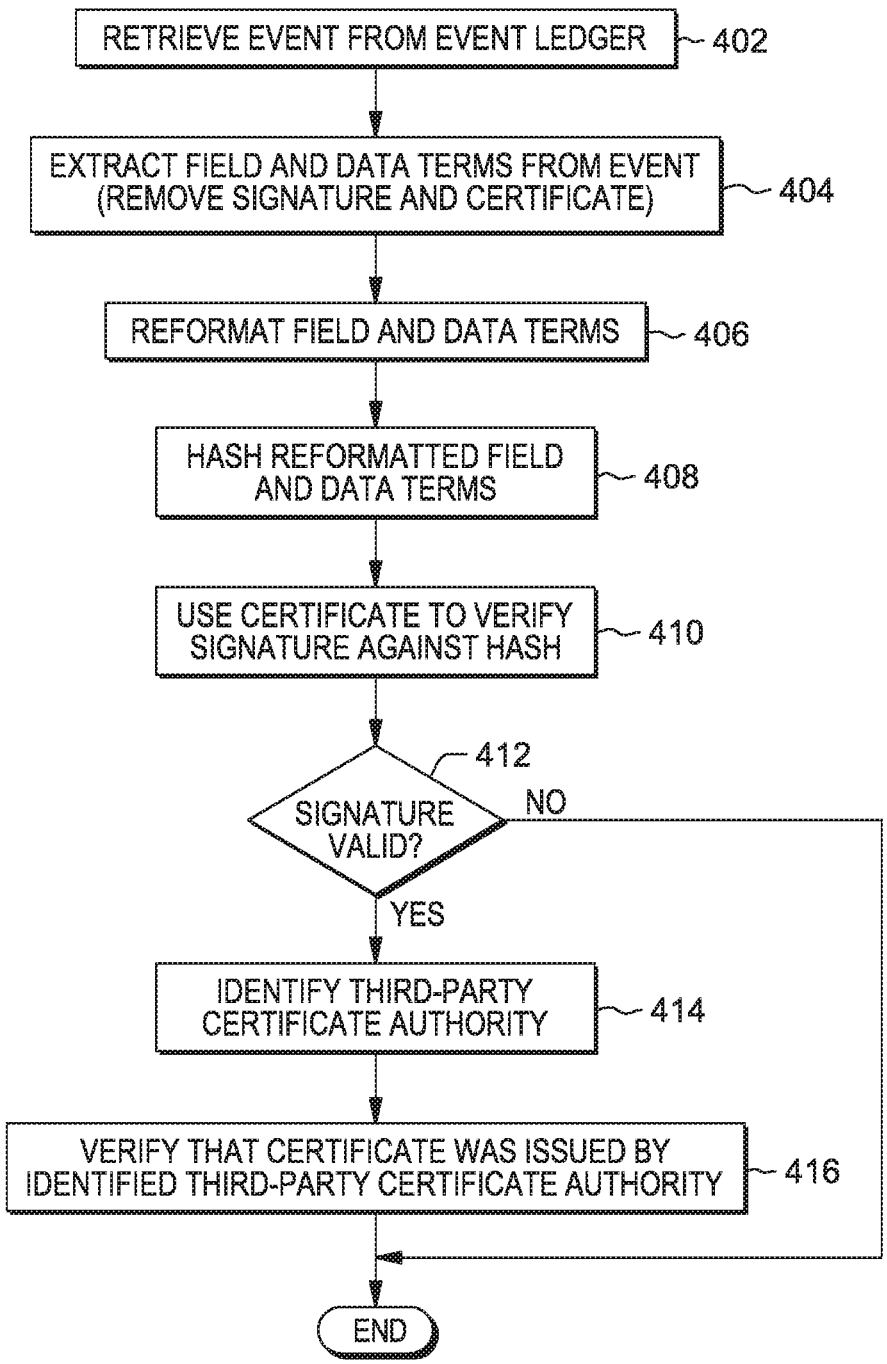
FIG. 4 is a flow chart of a method according to an embodiment of the present disclosure.

Once an event has been added to event ledger 101, any user may verify and validate the event in a similar manner to that performed by event ledger 101. For example, with reference now to FIG. 4, a method 400 of verifying and validating an event is disclosed. At 402, a user may retrieve the event from event ledger 101. At 404, the user may extract the field 202 (FIG. 2) and data 204 (FIG. 2) terms from the stored event, e.g., remove and signature and/or certificate data. At 406, in some aspects, the user may reformat the field 202 and data 204 terms, e.g., sort the fields and data into alphabetical order, remove white space, etc., depending on the format requirements set by event ledger 101. At 408, the user may hash the resulting string, for example, using a SHA-256 hashing algorithm, and may Base64-encode the result. At 410, the public key of the certificate may then be used to verify the signature against the Base64-encoded hash. At 412, the user may determine whether the signature is valid. If the signature is not valid, the method ends. If the signature is valid, at 414, the user may identify the third-party certificate authority associated with the certificate of the event. For example, the user may extract the name of the third-party certificate authority from the published event. At 416, the user may verify that the certificate was issued by the third-party certificate authority, for example, by requesting confirmation from the third-party certificate authority. Although method 400 is discussed with reference to a user of event ledger verifying an event after the event has published to the event ledger 101, any of the above steps of method 400 may also or alternatively be used by event ledger 101 when verifying an event and certificate prior to publishing the event on event ledger 101.

Figure 5:
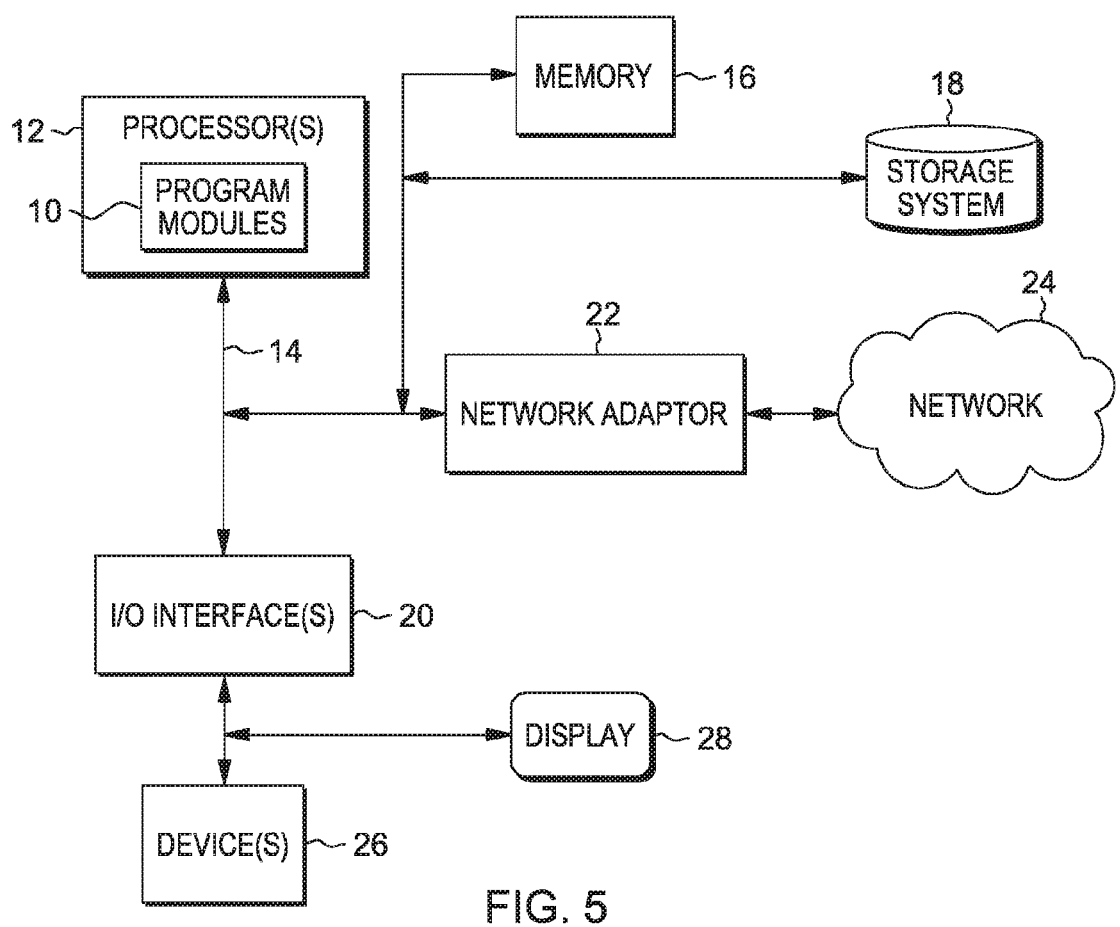
FIG. 5 is an exemplary block diagram of a computer system in which processes involved in the system, method, and computer program product described herein may be implemented.

FIG. 5 illustrates a schematic of an example computer or processing system that may implement any portion of system 100, computing devices 102 and 130, or any other systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented by at least one hardware processor comprising:
   receiving a request from a first party to publish an event occurrence to an event ledger, the event comprising:
   a first event data indicating a name of the publisher who can attest that said event occurred, said publisher identified by that publisher's domain name;
   a second event data indicating a date and time at which the event occurred;
   a third event data indicating a description of the event and an event type; and
   cryptographic signature of a string resulting from encoding a result of a hash function applied to the first, second and third event data, said first, second and third event data being formatted according to an event ledger requirement prior to applying the hash function, the string of the event signed using a private key of the publisher;
   receiving a certificate from an Internet address associated with the publisher domain name, the certificate comprising a public key of the publisher;
   verifying the cryptographic signature of the event using the received certificate;
   publishing the event to the event ledger, said event ledger comprising: a database shared by multiple computing nodes participating in a system based on a blockchain protocol, the database storing event data associated with events already occurred and published by publishers in a blockchain data structure and storing the certificate with the event to subsequently verify the identity of the publisher;
   subsequently receiving a query from a second party to search for an event in said event ledger; and in response,
   accessing said blockchain data structure of said database to obtain said event data for said searched event;
   providing to the second party said obtained event data from said ledger, and
   extracting said first, second and third event data from the obtained event data,
   removing said cryptographic signature from the event;
   reformatting said first, second and third event fields according to the event ledger requirement, and
   applying said hash function to the reformatted said first, second and third event data to obtain a further resulting string and encoding said further resulting string, said second party using said public key from said stored publisher certificate to sign the encoded further resulting string, said signed further resulting string used to verify validity of the cryptographic signature and event data authenticity, and
   using said verified authentic event as triggering condition to achieve fulfillment of a smart contract for said second party on a smart contract network.

2. The method of claim 1, wherein the certificate is an X.509 certificate of a domain name of the publisher.

3. The method of claim 2, wherein the X.509 certificate is downloaded from the domain name of the publisher.

4. The method of claim 1, wherein the request comprises the received certificate.

5. The method of claim 1, wherein the certificate is received separately from the request.

6. The method of claim 1, wherein verifying the cryptographic signature of the event using the received certificate comprises:
   removing the cryptographic signature from the event;
   hashing the remaining portions of the event; and
   using the public key to verify the cryptographic signature against the hash.

7. The method of claim 1, further comprising:
   identifying, based on the certificate, a third-party certificate authority; and
   verifying that the received certificate was issued by the third-party certificate authority.

8. The method of claim 7, further comprising:
   recording the name of the third-party certificate authority with the event in the event ledger.

9. A system comprising:
   at least one hardware processor configured to:
   receive a request from a first party to publish an event occurrence to an event ledger, the event comprising:
   a first event data indicating a name of a publisher who can attest that said event occurred, said publisher identified by that publisher's domain name;
   a second event data indicating a date and time at which the event occurred;
   a third event data indicating a description of the event and an event type; and
   a cryptographic signature of a string resulting from encoding a result of a hash function applied to the first, second and third event data, said first, second and third event data being formatted according to an event ledger requirement prior to applying the hash function, the string of the event signed using a private key of the publisher;
   receive a certificate from an address associated with the publisher domain name, the certificate comprising a public key of the publisher;
   verify the cryptographic signature of the event using the received certificate;
   publish the event to the event ledger, said event ledger comprising: a database shared by multiple computing nodes participating in a system based on a blockchain protocol, the database storing event data associated with events already occurred and published by publishers in a blockchain data structure and storing the certificate with the event to subsequently verify the identity of the publisher;

subsequently receive a query from a second party to search for an event in said event ledger; and in response, access said blockchain data structure of said database to obtain said event data for said searched event;

provide to the second party said obtained event data from said ledger, and extract said first, second and third event data from the obtained event data, remove said cryptographic signature from the event;

reformat said first, second and third event fields according to the event ledger requirement, and apply said hash function to the reformatted said first, second and third event data to obtain a further resulting string and encoding said further resulting string, said second party using said public key from said stored publisher certificate to sign the encoded further resulting string, said signed further resulting string used to verify validity of the cryptographic signature and event data authenticity, and use said verified authentic event as triggering condition to achieve fulfillment of a smart contract for said second party on a smart contract network.

10. The system of claim 9, wherein the certificate is an X.509 certificate of a domain name of the publisher.

11. The system of claim 10, wherein the X.509 certificate is downloaded from the domain name of the publisher.

12. The system of claim 9, wherein the request comprises the received certificate.

13. The system of claim 9, wherein the certificate is received separately from the request.

14. The system of claim 9, wherein verifying the cryptographic signature of the event using the received certificate comprises:
    removing the cryptographic signature from the event;
    hashing the remaining portions of the event; and
    using the public key to verify the cryptographic signature against the hash.

15. The system of claim 9, wherein the at least one hardware processor is further configured to:
    identify, based on the certificate, a third-party certificate authority; and
    verify that the received certificate was issued by the third-party certificate authority.

16. The system of claim 15, wherein the at least one processor is further configured to:
    record the name of the third-party certificate authority with the event in the event ledger.

17. A non-transitory computer readable medium comprising instructions that when executed by at least one hardware processor, configure the at least one hardware processor to:
    receive a request from a first party to publish an event occurrence to an event ledger, the event comprising:
        a first event data indicating a name of a publisher who can attest that said event occurred, said publisher identified by that publisher's domain name;
        a second event data indicating a date and time at which the event occurred;
        a third event data indicating a description of the event and an event type; and
        a cryptographic signature of a string resulting from encoding a result of a hash function applied to the first, second and third event data, said first, second and third event data being formatted according to an event ledger requirement prior to applying the hash function, the string of the event signed using a private key of the publisher;
    receive a certificate from an address associated with the publisher domain name, the certificate comprising a public key of the publisher;
    verify the cryptographic signature of the event using the received certificate;
    publish the event to the event ledger, said event ledger comprising: a database shared by multiple computing nodes participating in a system based on a blockchain protocol, the database storing event data associated with events already occurred and published by publishers in a blockchain data structure and store the certificate with the event to subsequently verify the identity of the publisher;
    subsequently receive a query from a second party to search for an event in said event ledger;
    and in response,
        access said blockchain data structure of said database to obtain said event data for said searched event;
        provide to the second party said obtained event data from said ledger, and extract said first, second and third event data from the obtained event data, remove said cryptographic signature from the event;
        reformat said first, second and third event fields according to the event ledger requirement, and
        apply said hash function to the reformatted said first, second and third event data to obtain a further resulting string and encoding said further resulting string, said second party using said public key from said stored publisher certificate to sign the encoded further resulting string, said signed further resulting string used to verify validity of the cryptographic signature and event data authenticity, and
        use said verified authentic event as triggering condition to achieve fulfillment of a smart contract for said second party on a smart contract network.

18. The non-transitory computer readable medium of claim 17, wherein verifying the cryptographic signature of the event using the received certificate comprises:
    removing the cryptographic signature from the event;
    hashing the remaining portions of the event; and
    using the public key to verify the cryptographic signature against the hash.

* * * * *